(12) United States Patent
Kano

(10) Patent No.: US 6,882,273 B2
(45) Date of Patent: Apr. 19, 2005

(54) SENSOR DEVICE, SETTING DEVICE, READING DEVICE, AND ARTICLE ADMINISTRATION SYSTEM

(75) Inventor: Shiro Kano, Tokyo (JP)

(73) Assignee: Yamatake Corporation, Tokyo (JP)

( * ) Notice: Subject to any disclaimer, the term of this patent is extended or adjusted under 35 U.S.C. 154(b) by 196 days.

(21) Appl. No.: 10/296,783

(22) PCT Filed: May 25, 2001

(86) PCT No.: PCT/JP01/04413

§ 371 (c)(1),
(2), (4) Date: Nov. 26, 2002

(87) PCT Pub. No.: WO01/92830

PCT Pub. Date: Dec. 6, 2001

(65) Prior Publication Data

US 2003/0107483 A1 Jun. 12, 2003

(30) Foreign Application Priority Data

May 30, 2000 (JP) .................................... 2000-160690

(51) Int. Cl.[7] .............................. G08B 1/08; H04Q 7/00
(52) U.S. Cl. .............................. 340/539.1; 340/539.22; 340/501
(58) Field of Search .................... 340/539.1, 539.22, 340/539.24, 501, 505, 506, 521, 522, 870.16, 870.17, 870.18, 10.1, 10.51

(56) References Cited

U.S. PATENT DOCUMENTS 4,750,197 A 6/1988 Denekamp et al.
5,597,534 A * 1/1997 Kaiser ..................... 422/82.02
5,659,302 A 8/1997 Cordier
5,963,147 A * 10/1999 Westfield et al. ...... 340/870.11
6,323,769 B1 * 11/2001 Dames .................... 340/572.2
6,392,562 B1 * 5/2002 Boston et al. ......... 340/870.28
6,570,508 B1 * 5/2003 Kvenvold ............. 340/870.17

FOREIGN PATENT DOCUMENTS

| JP | 63-042421 A | 2/1988 |
| JP | 02-090361 B2 | 3/1990 |
| JP | 04-221725 A | 8/1992 |
| JP | 5-322605 A | 12/1993 |
| JP | 10-289297 A | 10/1998 |

* cited by examiner

Primary Examiner—Toan N. Pham
(74) Attorney, Agent, or Firm—Frishauf, Holtz, Goodman & Chick, P.C.

(57) ABSTRACT

A sensor apparatus (2) has a coil (20) for receiving an electromagnetic wave energy applied from outside, a power supply section (21) for generating an internal power supply from the electromagnetic wave energy, and a sensing circuit (24) having a sensor device mounted thereon. The sensor apparatus receives and decodes a tolerance value intrinsic to the sensor apparatus and set by a configuration/read-out apparatus (1) based on the output of the sensing circuit of the sensor apparatus placed under a prescribed environment, and stores the tolerance value in a nonvolatile memory (23). The sensor apparatus placed under a measuring environment sends out the output of the sensing circuit and the tolerance value to the configuration/read-out apparatus.

17 Claims, 5 Drawing Sheets

SENSOR DEVICE, SETTING DEVICE, READING DEVICE, AND ARTICLE ADMINISTRATION SYSTEM

This application is a U.S. National Phase Application under 35 USC 371 of International Application PCT/JPQ1/04413 filed May 25, 2001.

BACKGROUND ART

The present invention relates to a sensor apparatus for detecting characteristics such as temperatures, pressures or the like, a configuration apparatus for making the setting for the sensor apparatus, and a read-out apparatus for reading out information from the sensor apparatus, and relates to a commodity management system that uses the sensor apparatus, configuration apparatus and read-out apparatus to conduct a management of commodities.

In a temperature control such as air conditioning, an air conditioning apparatus or the like is drive-controlled according to a decision result of whether or not detected temperature is within a tolerated temperature range, and a data-collecting apparatus is generally used for this decision. The data-collecting apparatus is constituted, for example, by a signal-processing circuit, having a thermosensitive device for detecting the temperature and an electronic circuit for converting an output of the thermosensitive device into an electric signal, and a controller connected to the signal-processing circuit for analyzing the output thereof.

In general, there are dispersions in the characteristics of the thermosensitive devices of the data-collecting apparatuses, and there is fear of the output (temperature detected by the thermosensitive device) of the electronic circuits not accurately indicating the actual temperature. Hence, calibration is done to decrease measurement errors caused by such dispersions.

For the calibration, a temperature measurement has been generally heretofore conducted by transmitting the output of the signal-processing circuit to the controller, after putting them in a constant temperature environment for a prescribed period of time in a state of being connected with each other through a cable or the like. Based on the relation of the signal-processing circuit output and the temperature acquired by conducting such temperature measurements in plural temperatures, the characteristics of the signal-processing circuit are calibrated on the controller side, and the calibrated result is stored in the controller. Before the shipment of the data-collecting apparatus, a tolerance value (tolerated temperature value for example) is set into the controller, which value prescribes the tolerated range for a parameter being detected by the sensor apparatus. In actual use of the data-collecting apparatus, the controller corrects the output of the signal-processing circuit (detected value) based on the calibration result, and performs a control in accordance with the result of comparison between the corrected detection value and the tolerance value.

With a conventional calibration method, therefore, it is necessary to constitute a data-collecting apparatus by use of a signal-processing circuit and a paired controller. This makes it impossible to constitute a data-collecting apparatus with a random signal-processing circuit and a random controller. Moreover, equipment such as a constant temperature bath becomes large-scale because calibration is done with the signal-processing circuit and the controller that are connected physically to each other.

Recently, a data-collecting apparatus has been proposed that includes signal-processing circuits each comprising a wireless communication function and configured to send the output of the sensor device thereof to the controller. The proposed apparatus has an advantage in being capable of detecting ambient temperature of any of a large number of commodities by having signal-processing circuits individually mounted thereon, but entails the following problems.

First of all, it is necessary to calibrate the characteristics of the individual signal-processing circuits, so as to decrease the measurement error caused by the dispersion (individual difference) of characteristics of the sensor apparatuses of the signal-processing circuits that causes the dispersion of outputs of the electronic circuits.

Secondly, since it is necessary to have the calibrated results of the individual signal-processing circuits stored in the controller beforehand, the individual signal-processing circuits and the controller are inseparable, which controller serves as a read-out apparatus for reading out information from the signal-processing circuits. A signal-processing circuit whose calibration result is not stored in the controller cannot be used with that controller. Thus, it is not possible to constitute a data-collecting apparatus with a random signal-processing circuit and a random controller.

Thirdly, the data-collecting apparatus is configured to process the outputs of the signal-processing circuits by means of a single controller, so that the controller is required to correct the individual circuit outputs on the basis of the calibration results for the respective signal-processing circuits stored therein. Therefore, the load on the controller becomes enormous with the increase in the number of signal-processing circuits, and there is a limit to the number of signal-processing circuits a single controller can handle.

DISCLOSURE OF THE INVENTION

An object of the present invention is to provide a sensor apparatus capable of making an accurate measurement even when the sensor apparatus is combined with a read-out apparatus that is not made corresponding to the sensor apparatus beforehand.

Another object of the present invention is to provide a configuration apparatus for making the setting of the sensor apparatus, a read-out apparatus for reading out information from the sensor apparatus, and a commodity management system that uses the sensor apparatus, the configuration apparatus and the read-out apparatus to conduct the management of the commodities, which apparatuses and system contribute to an effective utilization of the sensor apparatus.

In order to accomplish the object, a sensor apparatus according to one aspect of this invention comprises: a sensing circuit having a sensor device mounted thereon; a coil for taking in electromagnetic wave energy sent from electromagnetic wave radiating means provided outside; a power supply section connected to the coil for generating an internal power supply; an information decoding section for decoding information which includes a tolerance value for a parameter being detected by the sensing circuit and by which the electromagnetic wave energy is modulated; a nonvolatile memory for storing the tolerance value decoded by the information decoding section; and a transmitting section for sending the information based on the output of the sensing circuit to the outside.

The sensor apparatus of this invention stores the tolerance value in a manner readable from outside, which value enables removal of the individual differences of the sensor apparatuses. Hence, a measurement can be made accurately, even with a combination of a sensor apparatus and a read-out apparatus that is not made corresponding to the sensor apparatus beforehand.

For example, a standard value (a standard tolerance value) is acquired in advance by measuring the parameter value under prescribed conditions with use of a sensor apparatus having standard characteristics. Subsequently, on the basis of the standard value and the output (detected value) of the sensing circuit obtained under the same conditions, the tolerance value is corrected in an external apparatus or in a sensor apparatus so as to equivalently remove the deviation of the detected value from the standard value. In this way, a tolerance value suited for a sensor apparatus having standard characteristics is corrected into a value suited for a sensor apparatus having different characteristics. This correction is, so to speak, equivalent to calibrating the characteristics of a sensing circuit. When the correction of the tolerance value is made in an external apparatus, electromagnetic wave energy modulated by the corrected tolerance value is sent to the sensor apparatus from outside, and, in the sensor apparatus, the tolerance value is decoded and stored into the nonvolatile memory. On the other hand, when the correction of the tolerance value is conducted in the sensor apparatus, a standard tolerance value is sent to the sensor apparatus from outside, and, in the sensor apparatus, a tolerance value intrinsic to the sensor apparatus is acquired based on the standard tolerance value and the output value of the sensing circuit and is stored into the nonvolatile memory.

In the present invention, the output of the sensing circuit included in the information that is read out from the sensor apparatus and the corrected tolerance value correspond as a whole to the calibrated sensor output generated in the read-out apparatus and the tolerance value stored in the read-out apparatus in the conventional art. In other words, the sensor apparatus of this invention delivers a calibrated sensing circuit output equivalent, and therefore the read-out apparatus is not required to calibrate the output of the sensing circuit. That is, even when information is read out from a sensor apparatus by means of a read-out apparatus that is not configured corresponding to the sensor apparatus in advance, the individual differences of the sensor apparatuses are removed beforehand prior to the comparison, based on the information, of the sensing circuit output and the tolerance value. Hence, the comparison can be done accurately, and in other words, an accurate measuring value can be obtained. Therefore, it is not essential to use the sensor apparatus and the read-out apparatus in pairs. For example, when mass-producing a data-collecting apparatus that is constituted by a signal-processing circuit having a sensor apparatus and a controller that comprises an information read-out function, it is possible to assemble the individual data-collecting apparatuses using a random signal-processing circuit and a random controller.

In the present invention, preferably, the sensor apparatus has an output comparison section for comparing the output of the sensing circuit with the tolerance value.

With this preferred embodiment, the sensor apparatus is able to decide by itself whether or not the output of the sensing circuit has fallen outside the tolerated range indicated by the tolerance value, hence there is no need to provide decision means on the read-out apparatus side.

Preferably, the output comparison section stores a result of the comparison between the output of the sensing circuit and the tolerance value into the nonvolatile memory.

With this preferred embodiment, it is possible to store the comparison result in the nonvolatile memory for later recall. With this embodiment, therefore, it is not essential to read out the output of the sensor apparatus during the measurement and there is no need to install the read-out apparatus at the measuring site, as distinct from the conventional art in which the read-out apparatus reads out the output of the sensor apparatus and compares the same with the tolerance value during the measurement. Although the electromagnetic wave energy radiating means (energy supplying apparatus) is used to generate power supply in the sensor apparatus, the simplicity and easiness of the measurement is not impaired.

Preferably, the sensor apparatus has a resonance circuit including a coil, and means for changing over the resonance frequency of the resonance circuit in accordance with the comparison result in the output comparison section.

With this preferred embodiment, the sensor apparatus changes the resonance frequency depending on the comparison result of the output of the sensing circuit and the tolerance value, hence the read-out apparatus can perceive the comparison result instantly, by checking the resonance frequency.

According to another aspect of this invention, a configuration apparatus is provided which comprises: receiving means for receiving information from the sensor apparatus; configuration means for setting a tolerance value for a parameter being detected by the sensing circuit of the sensor apparatus, based on the information received by the receiving means from the sensor apparatus placed under a prescribed environment; and transmitting means for radiating electromagnetic wave energy which is modulated by the information.

With the configuration apparatus of the present invention, when information indicating the output of a sensor apparatus placed under a prescribed environment is sent out from the transmitting section of the sensor apparatus, the receiving means receives the information, and sends out the information to the configuration means. The configuration means is capable of storing, in advance, the standard value (standard tolerance value) indicating the output of a sensor apparatus of standard characteristics placed under the prescribed environment. In this case, the configuration means sets a tolerance value intrinsic to the individual sensor apparatuses, based on the standard value and the detected value (information received by the receiving means). The transmitting means radiates an electromagnetic wave energy modulated by information indicating the tolerance value set by the configuration means. The sensor apparatus decodes the tolerance value from the electromagnetic wave energy, and stores the tolerance value into the nonvolatile memory. This tolerance value enables the removal of individual differences of sensor apparatuses, when read out together with the output of the sensor apparatus.

By using the configuration apparatus in such a way, it is possible to set the individual sensor apparatuses with tolerance values intrinsic thereto, thereby eliminating the need of calibrating the output of the sensor apparatus on the read-out apparatus side. Therefore, an accurate measurement can be done even when a random sensor apparatus and a random read-out apparatus are combined, hence there is no need to use a particular sensor apparatus and a particular read-out apparatus in pairs.

According to a further aspect of the present invention, a read-out apparatus is provided which comprises transmitting means for radiating electromagnetic wave energy to the sensor apparatus, and receiving means for receiving information from the sensor apparatus.

With the read-out apparatus of the present invention, it is possible to activate the sensor apparatus by radiating electromagnetic wave energy from the transmitting means, and then receive the information from the sensor apparatus with the receiving means. The information from the sensor apparatus, including an output of the sensor apparatus and a tolerance value that enables the removal of individual differences of sensor apparatuses, eliminates the need of calibrating the output of the sensor apparatus on the read-out apparatus side. Therefore, an accurate measurement can be made based on information that is read out from the sensor apparatus using a random read-out apparatus.

According to a further aspect of the present invention, a commodity management system is provided which comprises the sensor apparatus mounted on a commodity, the configuration apparatus, and the read-out apparatus.

In the commodity management system of the present invention, tolerance values intrinsic to sensor apparatuses respectively mounted to, e.g., a large number of moving commodities are set beforehand using the configuration apparatus. Then, measurements are conducted by the individual sensor apparatuses under the measuring environment such as for example during the storage or the transportation of the commodity, and the measured results are stored. Then, the measured results are read out from the sensor apparatus by the read-out apparatus after the storage or transportation, and whether or not the management condition of the individual commodity during the storage or transportation was good is determined based on the measured results. With the present invention, an accurate measurement can be achieved even when a random sensor apparatus, a random configuration apparatus, and a random read-out apparatus are used in combination, hence a commodity management system can be constructed flexibly and easily. The commodity management system of the present invention is convenient especially for quality control of moving commodities. For example, a freshness management of perishable foods transported from the place of production to the market can be conducted satisfactorily.

BEST MODE FOR CARRYING OUT THE INVENTION

A sensor apparatus and a configuration/read-out apparatus according to a first embodiment of the present invention will be described with reference to FIGS. 1 to 4.

Figure 1:
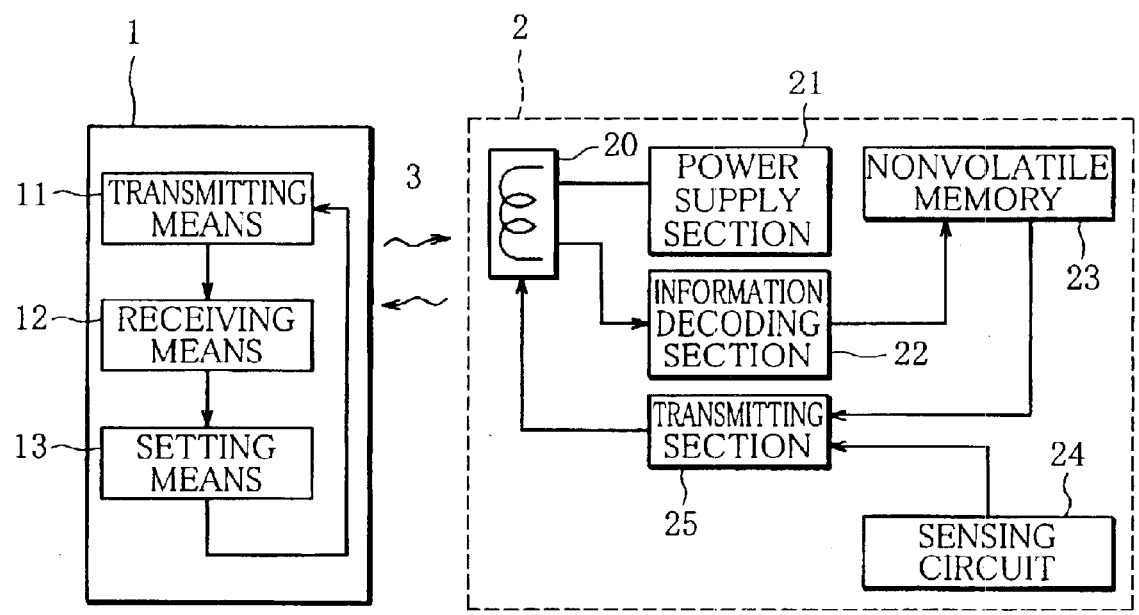
FIG. 1 is a schematic block diagram showing a sensor apparatus and a configuration/read-out apparatus according to a first embodiment of the present invention.

As shown in FIG. 1, a configuration apparatus (host machine) 1 is provided with transmitting means 11, receiving means 12, and tolerance value setting means 13, and also functions as a read-out apparatus (hereinafter the configuration apparatus 1 will be referred to as read-out apparatus 1 in some cases). A sensor apparatus (slave machine) 2 is provided with a coil 20, a power supply 21, an information decoding section 22, a nonvolatile memory 23, a sensing circuit 24, and a transmitting section 25. Reference number 3 denotes a communicating space between the configuration apparatus 1 and the sensor apparatus 2.

The sensor apparatus 2 can be provided at low costs by integrating the sensor apparatus 2 into a one-chip IC using semiconductors such as CMOS. In this case, the sensing circuit 24, which is provided with a sensor device such as a thermosensitive device, is also composed of CMOS. However, there are individual differences in the characteristics of sensing circuits that are made from a CMOS process, and the output value of the sensing circuit often disperses several tens of percents.

Calibration is made to eliminate such measurement errors due to the individual differences of the sensing circuits. In general, an output value, output from a sensor apparatus (same type or different type with the sensor apparatus being calibrated) having standard characteristics and put under a prescribed environment, is acquired beforehand as a standard value. Then, an output value of a sensor apparatus put under a prescribed environment and having an individual difference is calibrated based on the compared result of the standard value and the output value of the sensor apparatus. More specifically, in the case of a sensor apparatus provided with a thermosensitive device, calibration is done by comparing the temperature data output from a sensing circuit of the sensor apparatus under the measuring environment with the standard temperature value acquired beforehand using a standard sensor apparatus. In a sensor apparatus having a pressure-sensitive device, the measured pressure value of the sensor apparatus with individual difference is calibrated based on the standard pressure value acquired beforehand using a standard sensor apparatus. For sensor apparatuses with other types of sensing devices, standard values can also be acquired by preparing appropriate environments, and similar calibrations are conducted. The compared result of the calibrated output value and the tolerance value set beforehand are made available for various control use.

Although the above-mentioned calibration is also conducted in this embodiment in a broad sense, the configuration apparatus 1 and the sensor apparatus 2 of this embodiment are characterized in that the calibration is made on the tolerance value that relates to the output value of the sensing circuit 24 of the sensor apparatus 2.

For the calibration, a sensor apparatus with individual difference is placed under a prescribed environment, such as in a constant temperature bath. After the sensing circuit 24 of the sensor apparatus 2 has stabilized under the prescribed environment, the configuration apparatus 1 radiates an electromagnetic wave energy to the communicating space 3 from the transmitting means 11. When using the configuration apparatus 1 having a simplified circuit construction or using the sensor apparatus having an antenna constituted by a coil for receiving electromagnetic wave energy, it is appropriate to use, as the electromagnetic wave energy, radio waves ranging from a medium-wave of several hundreds of kHz to a short-wave of several tens of MHz, but the electromagnetic wave energy is not limited thereto. The configuration apparatus 1 amplifies a high-frequency signal generated by an oscillator (not shown) in the transmitting means 11, and radiates the amplified high-frequency signal serving as the electromagnetic wave energy to the communicating space 3 through the antenna.

Figure 2A:
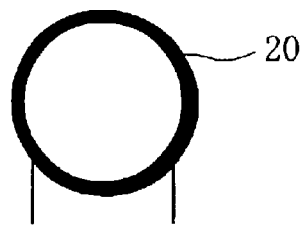
FIG. 2A is an illustration showing an example of a coil used in the sensor apparatus shown in FIG. 1.
Figure 2B:
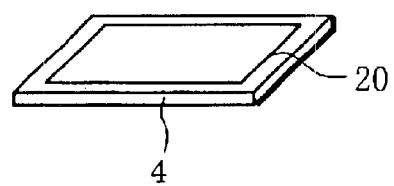
FIG. 2B is a schematic perspective view showing another example of a coil.
Figure 2C:
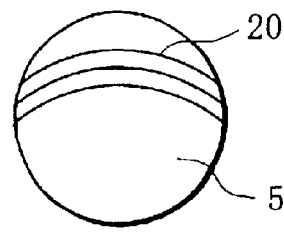
FIG. 2C is a schematic perspective view showing yet another example of a coil.

The electromagnetic wave energy is taken into the sensor apparatus 2 through the coil 20. The coil 20 can be a copper wire wound in loop-form, but can be formed on a semiconductor chip to make the sensor apparatus 2 compact. FIG. 2A shows a coil 20 made by winding a copper wire plural times, and FIG. 2B shows a coil 20 composed of a conductor formed by photolithography on the surface of a semiconductor chip 4. When a sensor apparatus 2 is implemented using a spherical semiconductor of few mm in diameter, the coil 20 is constituted by a few turns of conductor formed on the spherical surface of the spherical semiconductor 5, as shown in FIG. 2C. As shown in FIG. 2C, a sensor apparatus constituted by a spherical semiconductor is easy to install on objects such as commodities, and also easy to embed inside objects by use of appropriate means such as a syringe.

Figure 3:
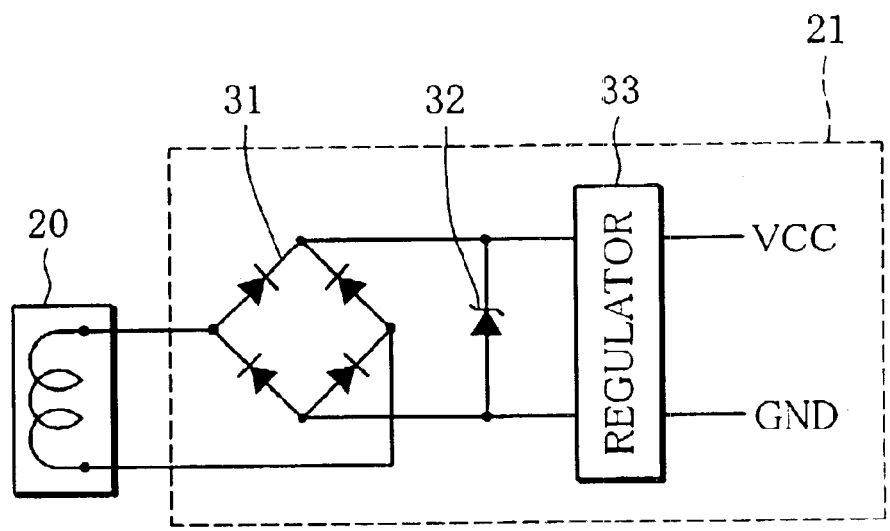
FIG. 3 is an illustration showing a construction example of a power supply section of the sensor apparatus shown in FIG. 1.

The electromagnetic wave energy taken in from the coil 20 is converted from AC (alternating current) into DC (direct current) in a power supply section 21, and an internal power supply is generated. An example of the power supply section 21 is shown in FIG. 3. The coil 20 is connected at both ends with a full-wave rectification circuit 31, and the electromagnetic wave energy is converted from AC (alternating current) to DC (direct current) in the full-wave rectification circuit 31. A limiter 32, constituted by a zener diode in the illustrated example prevents an overvoltage of several tens of volts generated across the coil 20 even when the communication distance between the sensor apparatus 2 and the configuration apparatus 1 gets close, for example, thereby preventing the destruction of devices in the sensor apparatus 2 caused by the overvoltage. The electromagnetic wave energy converted into DC (direct current) in the full-wave rectification circuit 31 is supplied to a regulator 33 under the protection of the limiter 32. The regulator 33 generates a prescribed voltage between the VCC (power supply line) and the GND (ground line), and supplies the same as power supply to respective circuits of the sensor apparatus 2. Although a full-wave rectification circuit is shown in this example to accomplish the rectifying function, a half-wave rectification circuit may be used. The limiter 32 is not limited to a zener diode, and the alternative such as a shunt regulator may be used so long as it can achieve a similar overvoltage protection effect.

When the internal power supply generated in the power supply section 21 is supplied to respective circuits of the sensor apparatus 2, the sensor apparatus 2 becomes operable. The sensing circuit 24 is composed of a ring oscillator or the like that is provided with a thermosensitive device, for example, and starts oscillating when it becomes operable.

Figure 4:
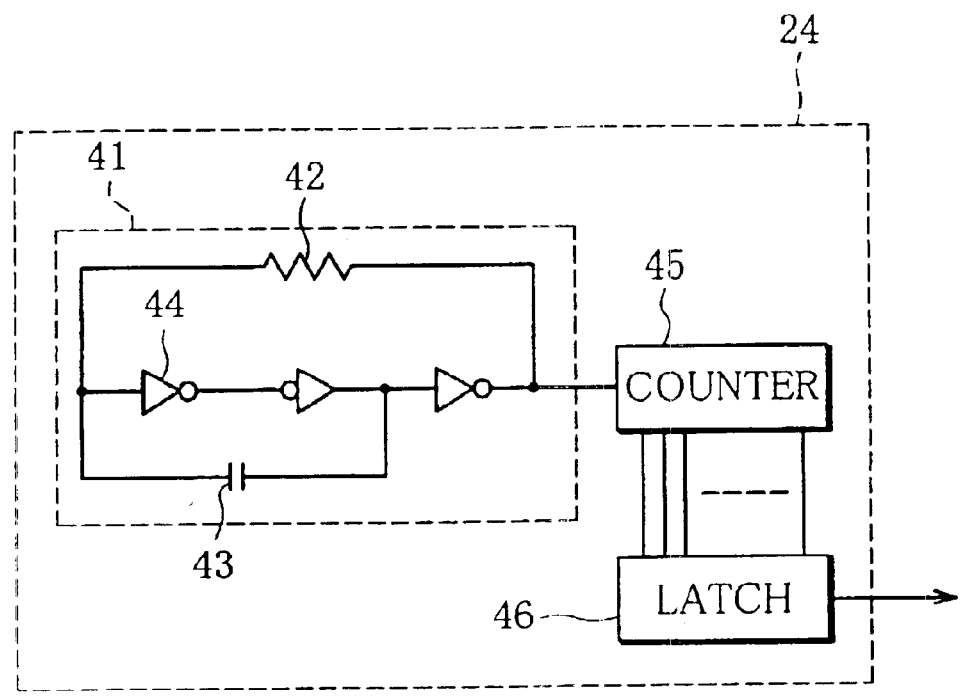
FIG. 4 is an illustration showing a construction example of the sensing circuit of the sensor apparatus shown in FIG. 1.

A construction example of the sensing circuit 24 is shown in FIG. 4. The sensing circuit 24 is constituted by: a ring oscillator 41 composed of a resistor 42, a capacitor 43, and a plurality of inverters 44; a counter 45 for measuring the oscillation frequency of the ring oscillator 41; and a latch 46 for retaining a count value of the counter 45 at a prescribed timing, which value indicates the oscillation frequency of the ring oscillator 41. The resistor 42 and capacitor 43 are thermosensitive devices having values (resistance value and capacitance value) thereof changing with varying ambient temperature, and the oscillation frequency of the ring oscillator 41 changes accordingly. The output of the ring oscillator 41 is input to the counter 45, and the oscillation frequency of the ring oscillator 41 is measured by the counter 45. Thus, the sensing circuit 24 having the temperature sensor device conducts a temperature measurement.

In measuring the oscillation frequency of the ring oscillator 41, a clock signal is produced by shaping the electromagnetic wave energy or the output of the ring oscillator 41 with a waveform-shaping circuit (not shown), and pulses are generated in the counter 45. For instance, the counter 45 counts the number of pulses generated in one cycle of generation of the clock signal. The waveform-shaping circuit may be eliminated, if an oscillator such as a crystal oscillator or an oscillating circuit such as a ring oscillator is added to the sensor apparatus 2. The count value of the counter 45 is retained in the latch 46 at a prescribed timing, and is transmitted to the transmitting section 25.

In this way, the temperature measurement for the calibration is conducted by the sensor apparatus 2 under a prescribed environment. For example, the sensor apparatus 2 measures that temperature of a constant temperature bath which is set to a known value, and the measured temperature is compared with the set temperature.

Specifically, the sensor apparatus 2 sends out the measured value corresponding to the known set temperature, which is the output value of the sensing circuit 24 (measured temperature data), to the configuration apparatus 1. More specifically, when the configuration apparatus 1 sends a measurement command signal to the sensor apparatus 2 by superimposing the measurement command signal on the electromagnetic wave energy to thereby request the sensor apparatus 2 to return the output of the sensing circuit 24, the sensor apparatus 2 decodes the measurement command signal in the information decoding section 22, and then returns the output value of the sensing circuit. Alternatively, the sensor apparatus 2 can be so configured that it returns the output of the sensing circuit 24 when receiving a non-modulating wave. In this case, the configuration apparatus 1 needs only to send the non-modulating electromagnetic wave energy.

In sending the measured temperature data, the transmitting section 25 of the sensor apparatus 2 encodes the data with biphase encoding, Manchester encoding or the like, and sends the encoded data to the configuration apparatus 1 through the coil 20. By way of example, there is a transmission method in which minute changes are generated in the magnetic field by changing the impedance of the sensor apparatus 2, or a method for transmitting a radio wave, and so on. The method is not limited thereto, so long as contactless data transmission to the configuration apparatus 1 can be achieved.

The configuration apparatus 1 receives the measured temperature data returned from the sensor apparatus 2 with the receiving means 12, restores the measured temperature data supplied from the sensor apparatus 2 by amplifying and demodulating the received data, and transmits the same to the tolerance value setting means 13. The tolerance value setting means 13 retains, as standard value data, the measured value measured by a standard sensor apparatus put under a prescribed environment, and conducts a calibration to match the measured temperature data sent from the sensor apparatus 2 with the standard value data.

As mentioned above, the sensor apparatus 2 conducts a temperature measurement for the calibration, and then the configuration apparatus 1 conducts a calibration based on the measured temperature data sent from the sensor apparatus 2. A specific example of the procedure will be described in the following.

First of all, first, second, and third constant temperature baths are prepared, which have the first, second, and third temperature settings (fifteen, twenty-five and thirty-five degrees centigrade, for example), respectively. The sensor apparatus 2 is put in the first constant temperature bath, and a measurement command signal is sent from the configuration apparatus 1 to the sensor apparatus 2, after the temperature of the sensor apparatus 2 has been stabilized at 15 degrees centigrade. Responding to the measurement command signal, the sensor apparatus 2 sends back the first measurement output value "a" (not shown) to the configuration apparatus 1. The configuration apparatus 1 stores the first temperature setting and the first measurement output value "a" as a pair. Then, the sensor apparatus 2 is put in the second constant temperature bath, and the same operation is done as above, and the configuration apparatus 1 stores the second temperature setting and the second measurement output value "b" (not shown) as a pair. Furthermore, the sensor apparatus 2 is put in the third constant temperature bath, and after the same operation, the configuration apparatus 1 stores the third temperature setting and the third measurement output value "c" (not shown) as a pair. The configuration apparatus 1 acquires a temperature-output characteristic curve that runs through the three points (fifteen degrees centigrade, "a"), (twenty-five degrees centigrade, "b"), and (thirty-five degrees centigrade, "c"), and stores the temperature-output characteristic curve. Instead of having three constant temperature baths, a single constant temperature bath that can be set sequentially to the first, second and third temperature settings can be used. Moreover, the accuracy goes up with the number of measurement points, but the workload also increases, hence measurement should be done with the number of measuring points as appropriate.

Then, setting work of the tolerance value will be conducted for the sensor apparatus 2, after the sensor apparatus 2 has been taken out of the constant temperature bath. In this case, the tolerance value represents, for example, the maximum, minimum, or the maximum-minimum value of the tolerated temperature to maintain the freshness of a food, and when the storing ambient temperature exceeds this tolerance value, there will be ill effects on the freshness of the food. The sensor apparatus 2 can be installed on various commodities such as fruits or frozen foods, for example, and the tolerance value (maximum value) can be set to twenty degrees centigrade for fruits, for example, and minus five degrees centigrade for frozen foods, for example.

In relation to the tolerance value with the conventional methods, the output value of the sensor apparatus is calibrated based on the deviation between the output value of the sensor apparatus and that of a standard sensor apparatus at the set temperature, and then compared with the tolerance value. This tolerance value, which is acquired from the temperature-output characteristic curve of a sensor apparatus with standard characteristics, is used in common for the individual sensor apparatuses. On the other hand, in this embodiment, a tolerance value intrinsic to each sensor apparatus is set based on the temperature-output characteristic curve of each sensor apparatus. In other words, in this embodiment, a standard tolerance value is calibrated into a tolerance value suitable for each of the sensor apparatuses, instead of calibrating the output value of the sensor apparatus.

Specifically, in setting the tolerance value, when an operator inputs, for example, twenty degrees centigrade for the setting on the tolerance value setting means 13 of the configuration apparatus 1, the configuration apparatus 1 calculates the measured output value "d" for the sensor apparatus 2 at twenty degrees centigrade, based on the temperature-output characteristic curve of the sensor apparatus 2 stored beforehand. In the sensor apparatus 2, as mentioned before, the measured temperature is indicated by the count value of the counter 45 in the sensing circuit, hence the configuration apparatus 1 calculates the equivalent count value for the measured output value "d", and sets this count value as the tolerance value. In this way, the tolerance value is set based on the temperature-output characteristic curve of the sensor apparatus 2, and becomes an intrinsic value for the sensor apparatus 2.

In the configuration apparatus 1, the tolerance value set at the tolerance value setting means 13 is supplied to the transmitting means 11, and the transmitting means 11 radiates the electromagnetic wave energy, which has the tolerance value data including the tolerance value (measured output value "d") superimposed thereon, towards the sensor apparatus 2. More specifically, the high frequency signal, which is the electromagnetic wave energy, is modulated by the tolerance value data, in order to superimpose the tolerance value data to the electromagnetic wave energy. There is an ASK (Amplitude Shift Keying) and a FSK (Frequency Shift Keying) for the modulation method to be considered, but the method is not limited thereto. Moreover, information indicating whether the tolerance value data is a maximum value or a minimum value is added to the tolerance value data.

In the sensor apparatus 2, when the coil 20 receives the electromagnetic wave energy, an internal power supply is generated in the power supply section 21, and circuits in the sensor apparatus 2 are rendered operable. In the information decoding section 22, the electromagnetic wave energy (modulated high frequency signal) on which the tolerance value data set in the configuration apparatus 1 is superimposed is demodulated, and the tolerance value data is decoded from the high frequency signal. The tolerance value data is stored in the nonvolatile memory 23.

Since the sensor apparatus 2 is designed to generate the internal power supply from the electromagnetic wave energy, the internal power supply cannot be generated in a case where no configuration apparatus 1 is installed or the sensor apparatus 2 is at a place where it cannot receive the electromagnetic wave energy from the configuration apparatus 1. Therefore, it is preferred to constitute the memory of the sensor apparatus 2 by a nonvolatile memory which retains the stored content even when there is no power supply. Since the tolerance value stored in the memory will be compared to the output value of the sensing circuit 24 in the temperature measurement subsequent to the tolerance value being set, it is preferred to use a fuse type memory that permits the tolerance value to be written only once thereby preventing subsequent erroneous writing. Memories such as EEPROM, which can be written electrically plural times, may also be used.

In the foregoing description, the setting of the tolerance value is conducted after the sensor apparatus 2 is taken out of the constant temperature bath, there is no limitation to the sequence. Taking the above case for example, work efficiency will increase by conducting the setting work of the tolerance value subsequent to the completion of the calibration operation with the sensor apparatus 2 placed in the constant temperature bath of thirty-five degrees centigrade.

However, in this case the sensor apparatus 2 may malfunction when the tolerance value is set to thirty-five degrees centigrade which is the same as the ambient temperature, hence such setting should be avoided.

In the above example, a temperature-output characteristic curve acquired from measured data of plural temperature measurement points is stored in the configuration apparatus 1. Instead of this, with the sensor apparatus 2 placed in a constant temperature bath set to the temperature equal to the set temperature (twenty degrees centigrade, for example) for the tolerance value setting, data measurement may be made only at this set temperature, and the measured value may be set as the tolerance value. In this case, the tolerance value is sent to the sensor apparatus 2 and stored in the nonvolatile memory 23, after the sensor apparatus 2 has been taken out of the constant temperature bath. In this manner, a method suited to the temperature management requirements of the sensor apparatus application system can be adopted for the setting of the tolerance value.

After the tolerance value is stored in the nonvolatile memory 23, the sensor apparatus 2 is mounted, for example, on an appropriate commodity and placed in the measuring environment, and is made available for measurement of ambient temperature of the commodity. In the temperature measurement, the sensor apparatus 2 is used with the configuration apparatus 1 (hereinafter referred to as read-out apparatus 1 or configuration/read-out apparatus 1) having a function of a read-out apparatus. The sensor apparatus 2 sends out the tolerance value along with the measured value (output value of the sensing circuit) to the read-out apparatus 1. In this embodiment, unlike the conventional methods, there is no need to calibrate the output of the sensor apparatus 2 on the read-out apparatus 1 side, hence the read-out apparatus 1 is not required to retain the temperature-output characteristic curve data related to the sensor apparatus 2 for which the setting of the tolerance value is completed. In other words, under the measuring environment, the sensor apparatus 2 is not only capable of being used with the configuration/read-out apparatus 1 used to set the tolerance value, but also capable of being used with other read-out apparatuses.

Specifically, under the measuring environment, the read-out apparatus 1 radiates the electromagnetic wave energy towards the sensor apparatus 2 from the transmitting means 11. A command to read out data from the sensor apparatus 2 is added to the electromagnetic wave energy. Alternatively, as mentioned before, the sensor apparatus 2 can be so configured as to send out data when receiving a non-modulating electromagnetic wave energy. The sensor apparatus 2 receives the electromagnetic wave energy at the coil, and generates an internal power supply in the power supply section 21 to become operable. When the sensor apparatus becomes operable, the output value is transmitted from the sensing circuit 24 to the transmitting section 25, and sent out from the transmitting section 25 to the outside. After this, the tolerance value stored under a prescribed environment is read out from the nonvolatile memory 23, transmitted to the transmitting section 25, and sent out to the outside in a similar way. However, the sequence of sending out the output value data and the tolerance value data is not limited to this sequence.

The read-out apparatus 1 receives the output value of the sensing circuit 24 and the tolerance value data sent out from the sensor apparatus 2, and after decoding and amplifying, compares the output value of the sensing circuit 24 and the tolerance value. For example, the output value data includes the count value of the sensing circuit 24 under the measuring environment. The tolerance value data includes the count value (hereinafter referred to as tolerance value or count value indicating the tolerance value) of the sensing circuit 24 at the set temperature (twenty degrees centigrade for example) related to the setting of the tolerance value, and a command indicating that the tolerance value is a maximum value. In this case, the read-out apparatus 1 compares the count value of the sensing circuit 24 under the measuring environment with the count value indicating the tolerance value, and determines whether or not the output value exceeds the tolerance value. When the output value of the sensing circuit 24 exceeds the tolerance value, the read-out apparatus 1 recognizes that the ambient temperature of the sensor apparatus 2 has exceeded the set temperature, and updates the history record along with the time of the occurrence. Furthermore, the read-out apparatus 1 starts a temperature control action in a case that it has a function of air conditioning equipment. Alternatively, the read-out apparatus 1 causes an air conditioning equipment connected thereto to start a temperature control action.

After that, the sensor apparatus 2 may send the output value of the sensing circuit continuously, or may send out commands at prescribed intervals to read out the output value of the sensing circuit. When the output of the sensing circuit 24 of the sensor apparatus 2 falls within the tolerated range again due to the temperature control action of the read-out apparatus 1, the read-out apparatus 1 stops the temperature control action, recognizing, based on the reply from the sensor apparatus 2, that the measured temperature is within the tolerated range.

The tolerated number of times a temperature of a commodity or the ambient temperature can exceed the maximum or minimum temperature varies with the durability of the commodity to the temperature. However, by repeating the comparison of the output value data from the sensor apparatus 2 and the tolerance value data, it is possible to perceive how many times the commodity or the ambient temperature has exceeded the tolerated range. This is effective for management of commodities for which a tolerance number of times the temperature can exceed is present. For the sensor apparatus 2 installed on a commodity that is not allowed to exceed the tolerance value even once, the read-out apparatus 1 can be arranged such that it ignores the response data from the sensor apparatus 2 once the output value has exceeded the tolerance value, or stops its action in response to a command or the like.

As mentioned above, the configuration apparatus 1 sets the tolerance value based on the output value of the sensing circuit of the sensor apparatus 2 under a prescribed environment, and sends the electromagnetic energy on which the tolerance value is superposed. Then the sensor apparatus decodes the tolerance value from the electromagnetic wave energy, and stores the tolerance value into the nonvolatile memory. Hence, the individual sensor apparatuses can retain a tolerance value calibrated for their sensing circuit. After the tolerance value is set for the individual sensor apparatuses, the read-out apparatus 1 can monitor whether or not the detected temperature by the sensor apparatus has fallen out of the set temperature range, by reading out and comparing the tolerance value and the output value of the sensing circuit. Hence, there is no need to make pairs of the read-out apparatus 1 and the sensor apparatus 2, and the read-out apparatus is free from the burden of keeping calibration data and tolerance value data for the respective sensor apparatuses therein. Meanwhile, it is possible to set plural tolerance values. For instance in the above example, the tolerance value can be set to fifteen degrees centigrade, twenty degrees centigrade and thirty degrees centigrade, and compared in multiple phases.

Figure 5:
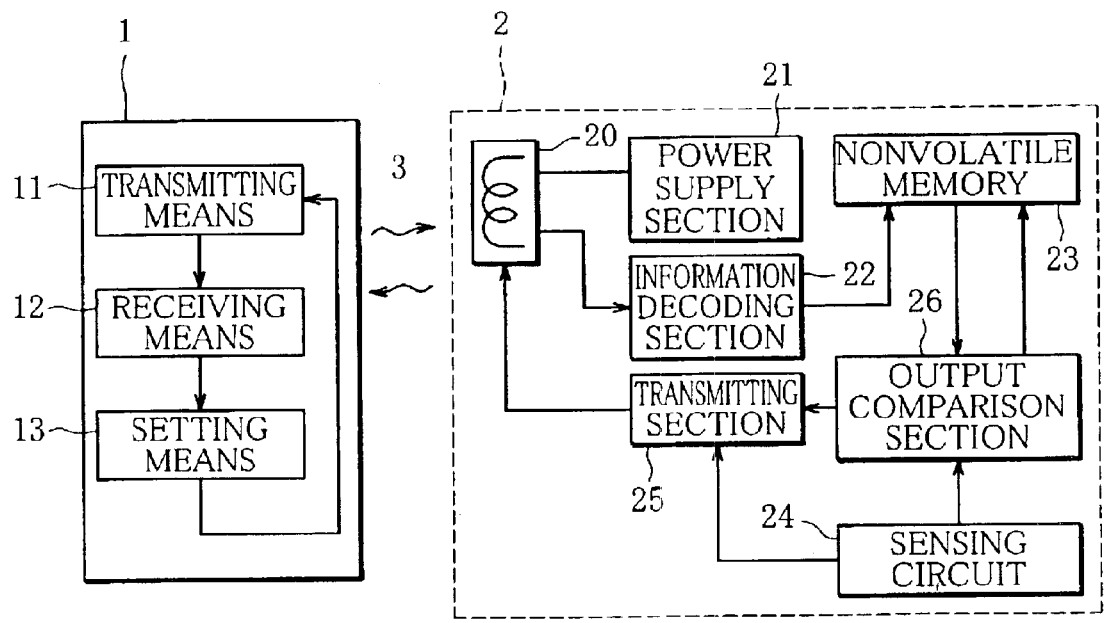
FIG. 5 is a schematic block diagram showing a sensor apparatus and a configuration/read-out apparatus according to a second embodiment of the present invention.

A sensor apparatus and a configuration/read-out apparatus according to a second embodiment of the present invention will be described with reference to FIG. 5.

The sensor apparatus and the configuration/read-out apparatus of the present embodiment differ from the first embodiment which compares the output value of the sensing circuit and the tolerance value in the read-out apparatus, in that such comparison is performed in the sensor apparatus and the compared result is sent out from the sensor apparatus to the read-out apparatus, but are similar to the first embodiment in other respects.

That is, the configuration/read-out apparatus of this embodiment has a function of a configuration apparatus, and also has a function of a read-out apparatus (hereinafter a configuration/read-out apparatus is sometimes referred to as a configuration apparatus or a read-out apparatus). The sensor apparatus 2 has a sensing circuit 24 provided with a temperature sensor device, and an output comparison section 26 for comparing the output value of the sensing circuit 24 and the tolerance value.

The setting of the tolerance value to the sensor apparatus 2 is achieved in a similar way with the first embodiment. In brief, a temperature-output characteristic curve of the sensor apparatus 2 is acquired based on the output value sent out from the the sensor apparatus 2 placed in a constant temperature bath, and the set temperature of the constant temperature bath. Then a tolerance value is acquired from this temperature-output characteristic curve, and written to the nonvolatile memory 23. After completion of the writing of the tolerance value, the sensor apparatus 2 is mounted on the commodity, and put under the measuring environment.

Under the measuring environment, the sensor apparatus 2 takes in the electromagnetic wave energy from the read-out apparatus 1 through the coil 20, generates an internal power supply from the electromagnetic wave energy in the power supply section 21, becomes operable with this internal power supply, and starts measuring temperature with the sensing circuit 24. The output comparison section 26 reads out the tolerance value from the nonvolatile memory 23, and compares the tolerance value with the output value of the sensing circuit 24.

Since the tolerance value to be compared to the output value is retained in the sensor apparatus 2 beforehand, there is no need to send the tolerance value from the read-out apparatus 1 to the sensor apparatus 2. Hence, the electromagnetic wave energy radiated from the read-out apparatus 1 can be a non-modulating wave, and need not be a modulating wave modulated by information indicating the tolerance value. With non-modulating waves, the electromagnetic wave energy does not include commands indicating comparison action timing. The comparison of the output value and the tolerance value can be made corresponding to the timing the count value (corresponding to the output value) is retained to the latch 46 of the sensing circuit 24. For example, such comparisons can be done at any time during the period in which the internal power supply can be generated from the electromagnetic wave energy sent from the read-out apparatus 1. On the other hand, when using an electromagnetic wave energy on which commands instructing the comparison timing is superimposed, the output comparison section 26 of the sensor apparatus 2 compares the output value and tolerance value when receiving such commands. It is possible to send such commands plural times during the period where internal power supply can be generated, and comparisons are done each time the commands are received.

The output comparison section 26 decides whether or not the output value of the sensing circuit 24 has exceeded the tolerance value, and transmits the decision result to the transmitting section 25. The transmitting section 25 transfers the decision result to the read-out apparatus 1 through the coil 20. The read-out apparatus 1 checks whether or not the temperature measured by the sensor apparatus 2 (output value) has exceeded the set temperature (tolerance value) based on the decision comparison result received from the sensor apparatus 2, and updates the record of decision history each time a decision is made. To put it simpler, the output comparison section 26 can be designed to send out only the decision result showing that the output value has exceeded the tolerance value, and in this case, the time that the measured temperature exceeded the set temperature, or the duration of the time the measured temperature exceeded the set temperature is recorded in the nonvolatile memory 23 of the sensor apparatus 2. In relation to the history record, for example, a counter for measuring the lapsed time since the beginning of the reception of the electromagnetic wave energy from the readout apparatus 1 is provided in the sensor apparatus 2.

When there is fear of the output of the sensing circuit 24 of the sensor apparatus 2 being unstable to fluctuate around the tolerance value, comparison can be stabilized by giving a hysteresis function to the decision means of the output comparison section 26. Moreover, an apparatus number intrinsic to the sensor apparatus 2 may be sent from the configuration apparatus 1 to the sensor apparatus 2 when storing the tolerance value to the nonvolatile memory 23 of the sensor apparatus 2, so that the apparatus number is written into the memory 23 along with the tolerance value. This makes it possible to send the apparatus number along with the comparison result of the output value and tolerance value from the sensor apparatus 2 to the read-out apparatus 1, and the read-out apparatus 1 can determine from which sensor apparatus the response was sent.

A commodity management system according to a third embodiment of the present invention will be described with reference to FIG. 6.

In recent times, strict quality control for commodities, especially for foods such as fruits, is required. For example, in case of foods being transported for long hours in airplanes and ships, freshness can decrease, and even rot, when the food is not stored within the tolerated range of temperature during the transportation. Hence, it is preferred that the temperature of the individual foods are measured during the transportation, and the commodities are assorted after the transportation, into those that were stored within the tolerated range of temperature, and those that were not stored within the tolerated range of temperature, based on the result of the temperature measurement.

The commodity management system of this embodiment is an answer to such requirements, and is constituted by a configuration/read-out apparatus and a plurality of sensor apparatuses, having the same basic construction as in the second embodiment. The sensor apparatuses can be mounted on various commodities, but in this embodiment, a case in which the sensor apparatus is embedded in the central part of a fruit such as an apple will be described. In FIG. 6, reference number 50 denotes a fruit as a commodity, which is transported in accommodation of a container 51. There is a electromagnetic wave energy supplying apparatus (corresponding to a configuration/read-out apparatus or a read-out apparatus) 1A provided in the container 51.

A sensor apparatus of this embodiment is provided, like the sensor apparatus in the second embodiment (refer to FIG. 5), with a sensing circuit 24 having a temperature sensor device, and a nonvolatile memory 23 with a tolerance value intrinsic to each sensor apparatus stored therewithin. The sensor apparatus is made to write the decision result to the nonvolatile memory 23, that the output value of the sensing circuit 24 has exceeded the tolerance value under the measuring environment of the transportation. Using this sensor apparatus, a quality control of the fruits 50 can be done easily in the assorting stage. The decision result data written into the nonvolatile memory 23 includes information on whether the tolerance value is a maximum value or a minimum value, and also information indicating the duration time that the output value exceeded the tolerance value.

The sensor apparatus 2 of this embodiment is a spherical integrated circuit device of one mm diameter, coated with an insulation layer (protection layer), and is capable of being embedded easily inside the core in the central portion of a fruit 50, with a syringe or the like. In other words, a spherical sensor apparatus can be acquired simply by having a spherical integrated circuit device coated with an insulation layer, and the coated sensor apparatus is suited for embedding inside a commodity since the sensor apparatus has no edges. Moreover, this sensor apparatus is superior compared to a spherically coated planar IC chip in operation effort and in maintaining the rigidity of the integrated circuit device. Resin material that is resistant to acidic fruit juice and has no problems regarding food hygiene is used for the insulation layer.

The embedding of the sensor apparatus 2 in a fruit 50 can be done during the growth process of the fruit. Moreover, such method as embedding the sensor apparatus under the peel of the fruit can be taken, for citrus fruits. An even easier method is to paste the sensor apparatus 2 to the fruit 50 with an adhesive tape or the like. That is to acquire a circular piece of sheet of 20 mm in diameter from an adhesive sheet having an adhesive material layer on the backside, and arrange the sensor apparatus 2 in the central portion of the piece of sheet, and to adhere the piece of sheet on the surface of the fruit 50. The material and thickness of the sheet should be selected, so that the sensor apparatus 2 does not fall off due to being torn while in use, also so that the sheet does not cut off the electromagnetic wave energy being sent to the sensor apparatus 2, and also so that the sheet does not pose any problems regarding food hygiene. Moreover, the sheet should be made easy to recognize with naked eyes, by putting on an appropriate color or pattern or trademark, so that the consumer does not eat the sheet mistakenly.

Since the sensor apparatus 2 is spherical in shape with a diameter of only about one mm, the surface of the piece of sheet protrudes only slightly when pasted on the surface of the fruit 50. Hence, there is little possibility of the fruits 50 getting damaged by the sensor apparatus 2, while the fruits 50 rub each other in transportation. But in the case of an apple or the like, it is even better when the piece of sheet was pasted so that the sensor apparatus 2 fits into the dent on the top or bottom portion. Or better still, when the piece of sheet was pasted so that the sensor apparatus 2 was placed at a portion that pose no problem, in the unlikely event of the portion being damaged, such as the calyx or the like.

Each of the sensor apparatus 2, as mentioned before, has an intrinsic tolerance value stored in the nonvolatile memory 23, which enables eliminating the effect of manufacturing dispersions of the sensing circuits. All of the sensor apparatuses accommodated inside the container 51 is put in a continuous operable state by receiving the electromagnetic wave energy from the energy supplying apparatus (corresponding to the configuration apparatus or the read-out apparatus) 1A, and compares the output value of the sensing circuit and the tolerance value, and writes the comparison result on the nonvolatile memory.

After the transportation, inspection is done whether or not the quality has been maintained for each one of the fruits (commodities) 50 taken out of the container 51. In the inspection, the fruit 50 moves along with the belt conveyer 52 near to the read-out apparatus 1B that is installed in the sorting workplace. When the fruit 50 passes through the read-out apparatus 1B, information stored in the nonvolatile memory 23 of the individual sensor apparatus 2 is read out by the read-out apparatus 1B. When the output value of the sensing circuit 24 exceeds the tolerance value, such information is written on the nonvolatile memory 23, and the read-out apparatus 1B notifies the sorter 53 whether or not such information exists, and the sorter 53 sorts the fruits 50 into non-defective units and defective units.

Figure 6:
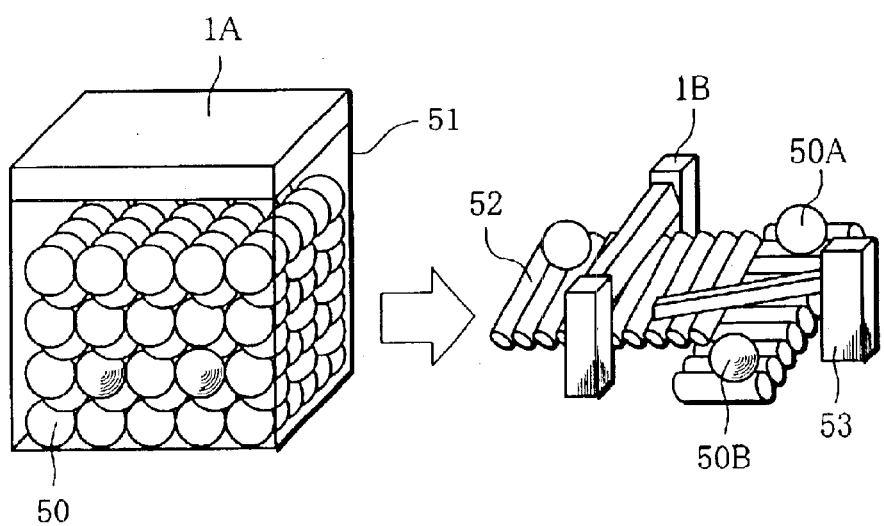
FIG. 6 is a schematic perspective view showing a commodity management system according to a third embodiment of the present invention.

In FIG. 6, the fruit 50B is screened as a defective unit by the sorter 53, because it was determined that the fruit could not be assured of quality, since the fruit was stored outside of the tolerated temperature range. On the other hand, the fruit 50A is screened as a non-defective unit, because the fruit was stored within the tolerated temperature range.

In this way, by mounting or embedding the sensor apparatuses 2 in the individual commodities, and by storing the fact that the temperature of the commodity has fallen out of the tolerated temperature range as history record, when that happens, and then by having commodities sorted based on this history, it becomes possible to conduct temperature management and sorting according to the individual commodities. Furthermore, conventional wiring used for connection between the sensor apparatus and the read-out apparatus is not necessary, because information collection is done in a non-contact condition. Needless to say, it should be noted that it is possible to write on the nonvolatile memory, the history record acquired from the aforementioned plural comparisons of the output value and the tolerance value. Furthermore, plural tolerance values can be set for multiple phases.

Figure 7:
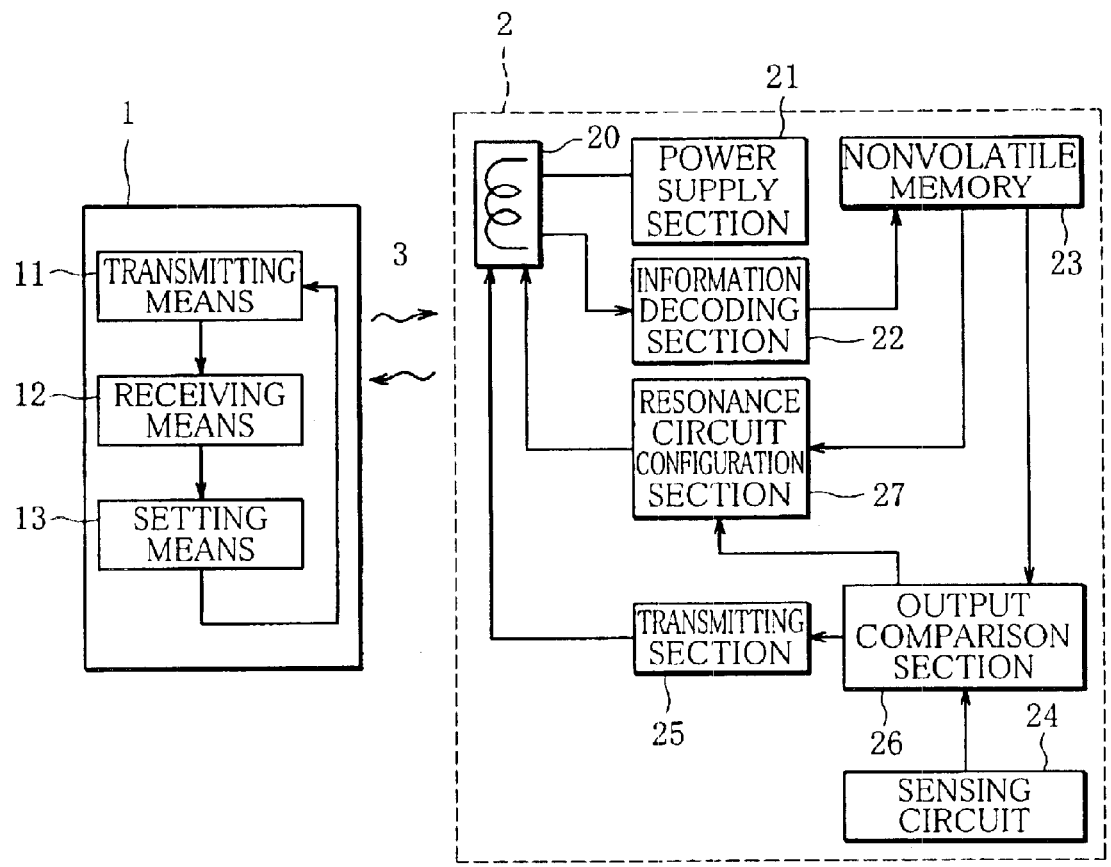
FIG. 7 is a schematic block diagram showing a commodity management system according to a fourth embodiment of the present invention.
Figure 8:
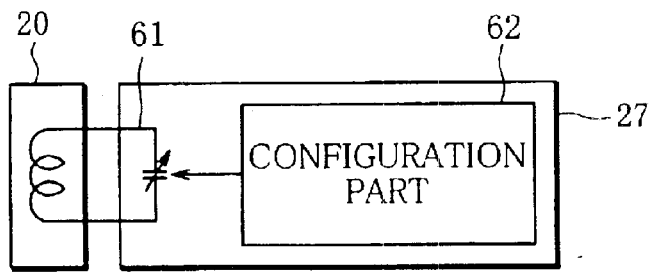
FIG. 8 is an illustration showing a resonance circuit configuration section shown in FIG. 7.

A commodity management system according to a fourth embodiment of the present invention will be described with reference to FIGS. 7 and 8.

The commodity management system of this embodiment makes it possible for the read-out apparatus to determine easily whether or not the output values of the sensor apparatuses mounted on the individual commodities have fallen out of the tolerance range even once, and this makes the sorting of the commodities even easier.

The sensor apparatus 2 of this embodiment is the same as in the second embodiment in that the tolerance value sent out from the configuration apparatus 1 is stored in the nonvolatile memory 23 and the output value of the sensing circuit 24 is compared with the tolerance value in the output comparison section 26. However, as distinct from the second embodiment, it is provided with a resonance circuit configuration section 27.

That is, when the output value of the sensing circuit 24 exceeds the tolerance value, the output comparison section 26 notifies the resonance circuit configuration section 27 of such occurrence. As shown in FIG. 8, the resonance circuit configuration section 27 is constituted by a variable capacitor 61, and a configuration part 62 for setting the capacitance value of the variable capacitor 61, and is connected to a coil 20 and the output comparison section 26.

In setting the tolerance value to the sensor apparatus 2, it is preferred that the resonance frequency of the resonance circuit constituted by the coil 20 and the variable capacitor 61 is set to be the same value (hereinafter referred to as the first resonance frequency value) as the frequency of the high frequency signal (electromagnetic wave energy) sent from the configuration apparatus 1. With this frequency, the receiving efficiency is made high, enabling generation of enough power supply to make respective circuits of the sensor apparatus 2 operable.

When a control signal, which indicates that the output value of the sensing circuit 24 has exceeded the tolerance value, is transmitted from the output comparison section 26 of a sensor apparatus 2 placed under the measuring environment to the configuration part 62 of the resonance circuit configuration section 27, the configuration part 62 changes the capacitance value of the variable capacitor 61, and sets the resonance frequency of the resonance circuit, constituted by the coil 20 and the variable capacitor 61, to be a different value (hereinafter referred to as the second resonance frequency value) from the resonance frequency of the electromagnetic wave energy being sent by the read-out apparatus 1.

In this way, by changing the resonance frequency value from the first resonance frequency value to the second resonance frequency value, the sensor apparatus 2 becomes disabled, because the receiving efficiency of the electromagnetic wave energy decreases, and the power supply section 21 is not able to generate internal power supply anymore. Hence, a fuse type nonvolatile memory is installed in the configuration part 62, so that information indicating the capacitance value of the capacitor 61, which is the set value of the resonance frequency can be retained even when the internal power supply of the sensor apparatus 2 becomes extinct. Alternatively, a nonvolatile memory 23 can be used for such memory use.

In the sorting operation of the individual commodities, the electromagnetic wave energy supplying apparatus 1B placed on the upstream stage of the sorter 53, radiates a high frequency signal whose frequency is equal to the second resonance frequency value. On the other hand, information is stored in the nonvolatile memory of the configuration part 62 of the sensor apparatus that had the output value of the sensing circuit 24 exceed the tolerance value, which makes the receiving efficiency of the electromagnetic wave energy of the above sensor apparatus maximum, when receiving a high frequency signal of the second resonance frequency value. Moreover, information is stored in a sensor apparatus that did not have the output value exceed the tolerance value, which makes the receiving efficiency of the electromagnetic wave energy of the sensor apparatus maximum, when receiving a high frequency signal of the first resonance frequency value.

Therefore, of all the sensor apparatuses that came near the energy supplying apparatus 1B, only those that had the output value of the sensing circuit 24 exceed the tolerance value become operable with the high frequency signal sent by the energy supplying apparatus 1B. That is, the energy supplying apparatus (read-out apparatus) 1B is capable of determining whether the maintenance condition of each commodity having the sensor apparatus installed was good or not.

It is possible for the energy supplying apparatus 1B to sweep the frequency in the radiation of the high frequency signal, and detect the resonance frequency of the sensor apparatus 2. The detection of the resonance frequency can be done by checking the degree of coupling with the resonance circuit of the sensor apparatus 2, or the like. With this method, it is possible to collect the detection result of the sensing circuit of each sensor apparatus merely by checking the resonance frequency of the sensor apparatus 2.

Furthermore, the read-out apparatus 1B can make the individual sensor apparatuses 2 operable selectively, thereby causing them to return data. To this end, only an electromagnetic wave energy with either the first or the second frequency value is sent. Only those sensor apparatuses, having a resonance circuit whose resonance frequency coincides with the frequency of the electromagnetic wave energy, increase in receiving efficiency and are hence rendered operable, whereby data is returned from these sensor apparatuses. Alternatively, plural frequency signals each having the first or the second frequency value can be sent, making the individual sensor apparatuses 2 operable so as to cause them to return data.

A temperature measurement system according to a fifth embodiment of the present invention will be described with reference to FIG. 9.

In measuring the surface temperature of a rotating body such as a drill, it was not possible to connect a sensor device, such as a resistance temperature sensor, to an electronic-processing circuit with cables or the like. Thus, a measuring of the surface temperature of a rotating body was difficult.

Furthermore, the injection-molding machine used for molding resin is designed so that a plastic resin material (raw material) thrown in from an input opening 91 is melted and kneaded in a screw 90, and then the resin material is injected into a metal mold at high pressure. The screw 90 is maintained at high temperature, along with being given rotation. To control the temperature of such a screw 90, conventional methods measured the temperature of the screw indirectly with a temperature sensor installed on the outer-wall fixed to the exterior of the screw 90, and did not measure the temperature of the screw 90 itself.

The temperature measurement system of this embodiment is intended for the temperature measurement of rotating bodies, such as the screw of an injection-molding machine, and is provided with a sensor apparatus and a read-out apparatus.

Figure 9:
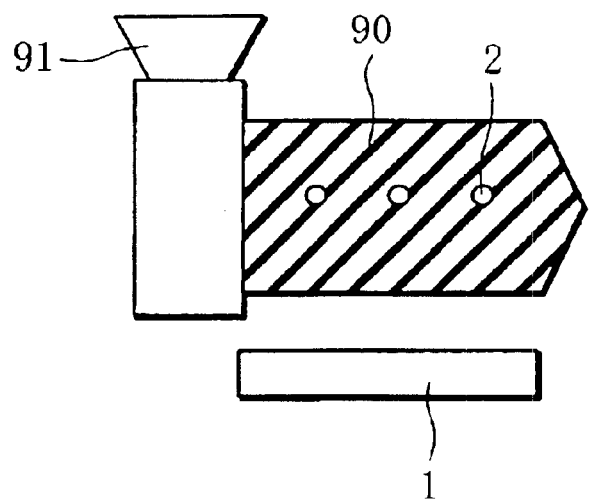
FIG. 9 is an illustration showing a temperature-measuring system according to a fifth embodiment of the present invention.

To be specific, a few sensor apparatuses 2 are buried in the screw 90, as shown in FIG. 9. To this end, dents that can accommodate sensor apparatuses 2 such as the one shown in FIG. 2C are formed on the screw 90 at the time of manufacturing, and sensor apparatuses 2 coated with insulation layers or the like are put into the dent, and secured with an adhesive or a coagulant. Then the screw 90 with the sensor apparatus 2 secured is assembled into the injection-molding machine, and a read-out apparatus 1 is arranged outside the screw 90. The molding temperature necessary to give plasticity to a thermoplastic material by heating is stored as the tolerance value in the nonvolatile memory of the sensor apparatus 2.

During the operation of the injection-molding machine, the screw 90 melts the plastic resin in high temperature while rotating, and the temperature at this instant is measured by the sensor apparatus 2, and the temperature information and the tolerance value are collected contactlessly by the read-out apparatus 1. The read-out apparatus 1 compares the temperature information (measured value) and the tolerance value, and when the measured value exceeds the tolerance value, the read-out apparatus sounds the alarm, or transmits control signals to the injection-molding machine to maintain the molding temperature constant. In this way, the temperature of the screw 90 itself can be measured directly, unlike conventional methods indirectly measuring the temperature of the screw 90, making it possible to determine accurately and adjust the molding temperature.

As a matter of course, the sensor apparatus 2 can be designed to determine whether or not the measured value has exceeded the tolerance value, so that the read-out apparatus 1 collects only the decision results. It is also possible to determine whether or not there is a decrease in durability due to the heat of the screw 90 by recording the history of the temperature information of each sensor apparatus mounted on the screw 90, at each injection-molding cycle. Moreover, a sensor apparatus 2 mounted with a pressure-sensitive device can be installed on the injecting portion to measure the injection pressure to the metal mold.

Figure 10:
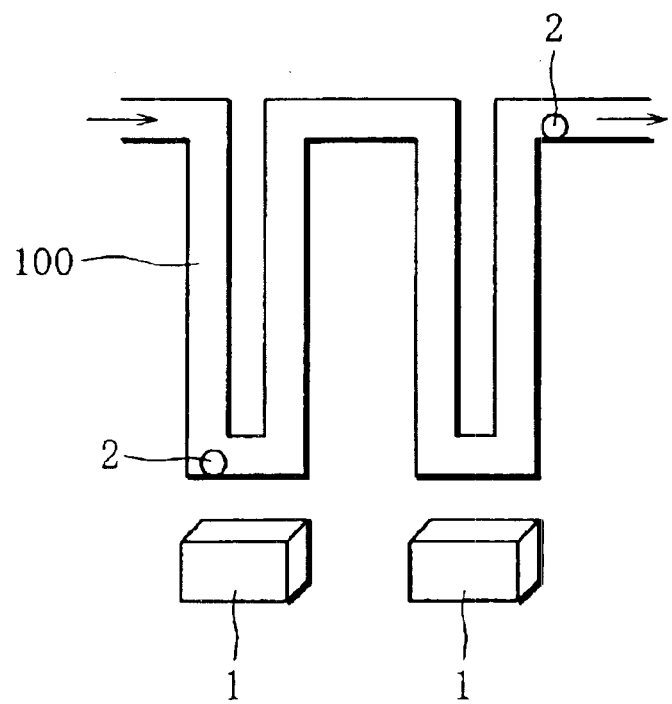
FIG. 10 is a view showing a fluid-measuring system according to a sixth embodiment of the present invention.

A fluid measurement system according to a sixth embodiment of the present invention will be described with reference to FIG. 10.

In order to measure the state of fluid flowing inside a pipe 100, a measuring device having a sensor inserted into a prescribed portion of the pipe 100 has been employed. However, such a measuring device entails a problem of obstructing the flow of the fluid or the like. When radiation was used to measure the condition inside the pipe 100, an expensive measuring device and expertise were required.

The fluid measurement of this embodiment is constituted by the aforementioned sensor apparatus 2 and read-out apparatus 1. Specifically, as shown in FIG. 10, the sensor apparatus 2 is coated with an insulation layer and thrown into the fluid, and arranged to be movable along with the fluid inside the pipe 100. A tolerance value is stored in the nonvolatile memory of the sensor apparatus. This sensor apparatus 2 has a sensor device for detecting the condition inside the fluid, such as a sensor device to measure flow rate or a temperature sensor device. Moreover, a read-out apparatus 1 is installed around the pipe 100, and in the vicinity of the read-out apparatus 1, an induction field is formed by the electromagnetic wave energy radiated from the read-out apparatus 1. The sensor apparatus 2, which is rendered operable when reaching the vicinity of the read-out apparatus 1 and receiving the electromagnetic wave energy, measures the output data of the sensor device at that instant, and sends out the output data along with the tolerance value. The read-out apparatus 1 analyses from the collected data, the condition or ingredients of the fluid in the pipe 100, and determines whether or not the condition of the fluid is within a prescribed tolerated range, and conducts the fluid control. The comparison result of the output value of the sensor device and the tolerance value can be stored in the nonvolatile memory of the sensor apparatus 2. In this case, the read-out apparatus 1 can read-out data from the memory in one operation at the exit of the pipe 100, and grasp in one operation the condition of the fluid in respective places of the pipe 100. The electromagnetic wave energy can be made to always propagate inside the pipe 100 to generate an induction field, so that the sensor apparatus 2 can receive the electromagnetic wave energy anywhere inside the pipe 100. In this case, the sensor apparatus 2 can continuously generate an internal power supply, and collect data by having the sensor device operated, in all portions of the pipe 100. In this case, the occurrence of the abnormal condition can be stored in the nonvolatile memory at constant intervals, or when the abnormal condition is recognized based on the comparison result of the output value and the tolerance value. By mounting a sensor device suiting the application on the sensor apparatus 2, it becomes possible to grasp any kind of condition inside the pipe 100, such as the temperature distribution, the flow rate variation, or the corroded portion inside the pipe 100, and so on.

For example, the temperature sensor device can be constituted by a ring oscillator that uses a thermosensitive device, as shown in FIG. 4, but is not limited to this constitution so long as the temperature sensor device can transform the measured temperature to an electric signal. Furthermore, a pressure-sensitive device for detecting pressure can be used. In this case, the pressure-sensitive device along with the sensing circuit can be integrated on one piece of semiconductor. Moreover, other sensor devices or sensing circuits can be integrated, in similar ways. It is possible to make decisions from the history of the comparison results of the output value and the tolerance value, in any of these constitutions.

Instead of setting the tolerance value on the read-out apparatus side, it is possible to set the tolerance value indicating the tolerated temperature range in the sensor apparatus beforehand, and to provide the sensor apparatus with functions of changing the setting of the tolerance value based on the sensor output and the set tolerance value under a prescribed environment, and of sending out the resultant information, thereby eliminating the need of providing tolerance value configuration means on the read-out apparatus side.

Needless to say, the sensor apparatus can use the transmitting section to send the result of a prescribed processing in the sensor apparatus, such as the result of processing based on the measurement result of the sensing circuit, or the results of processing following commands of the read-out apparatus.

The present invention is not limited to the foregoing embodiments, and may be modified without departing from the gist of the present invention.

What is claimed is:

1. A sensor apparatus comprising:
   a sensing circuit having a sensor device mounted thereon;
   a coil for taking in electromagnetic wave energy sent from electromagnetic wave energy radiating means provided outside;
   a power supply section connected to said coil for generating an internal power supply;
   an information decoding section for decoding information by which the electromagnetic wave energy is modulated and which includes a tolerance value for a parameter being detected by said sensing circuit;
   a nonvolatile memory for storing the tolerance value decoded by said information decoding section; and
   a transmitting section for sending information based on an output of said sensing circuit to the outside.

2. The sensor apparatus according to claim 1, further comprising:
   an output comparison section for comparing the output of said sensing circuit with the tolerance value.

3. The sensor apparatus according to claim 2, wherein said output comparison section stores a result of the comparison into said nonvolatile memory.

4. The sensor apparatus according to claim 3, further comprising:
   a resonance circuit including said coil, and
   means for changing over a resonance frequency of said resonance circuit in accordance with a result of the comparison in said output comparison section.

5. A configuration apparatus comprising:
   receiving means for receiving information from the sensor apparatus as set forth in claim 3;

configuration means for setting a tolerance value for a parameter being detected by the sensing circuit of said sensor apparatus, based on the information received by said receiving means from said sensor apparatus placed under a prescribed environment; and transmitting means for radiating electromagnetic wave energy which is modulated by the information.

6. A read-out apparatus comprising:

transmitting means for radiating electromagnetic wave energy to the sensor apparatus as set forth in claim 3; and receiving means for collecting information from said sensor apparatus.

7. A commodity management system comprising:

the sensor apparatus as set forth in claim 3 and mounted on a commodity;

receiving means for receiving information from the sensor apparatus;

configuration means for setting a tolerance value for a parameter being detected by the sensing circuit of said sensor apparatus, based on the information received by said receiving means from said sensor apparatus placed under a prescribed environment;

transmitting means radiating electromagnetic wave energy which is modulated by the information, said transmitting means radiating electromagnetic wave energy to the sensor apparatus; and receiving means for collecting information from said sensor apparatus.

8. The sensor apparatus according to claim 2, further comprising:

a resonance circuit including said coil, and means for changing over a resonance frequency of said resonance circuit in accordance with a result of the comparison in said output comparison section.

9. A configuration apparatus comprising:

receiving means for receiving information from the sensor apparatus as set forth in claim 8;

configuration means for setting a tolerance value for a parameter being detected by the sensing circuit of said sensor apparatus, based on the information received by said receiving means from said sensor apparatus placed under a prescribed environment; and transmitting means for radiating electromagnetic wave energy which is modulated by the information.

10. A read-out apparatus comprising:

transmitting means for radiating electromagnetic wave energy to the sensor apparatus as set forth in claim 8; and receiving means for collecting information from said sensor apparatus.

11. A commodity management system comprising:

the sensor apparatus as set forth in claim 8 and mounted on a commodity;

receiving means for receiving information from the sensor apparatus;

configuration means for setting a tolerance value for a parameter being detected by the sensing circuit of said sensor apparatus, based on the information received by said receiving means from said sensor apparatus placed under a prescribed environment;

transmitting means for radiating electromagnetic wave energy which is modulated by the information, said transmitting means for radiating electromagnetic wave energy to the sensor apparatus; and receiving means for collecting information from said sensor apparatus.

12. A configuration apparatus comprising: receiving means for receiving information from the sensor apparatus as set forth in claim 2;

configuration means for setting a tolerance value for a parameter being detected by the sensing circuit of said sensor apparatus, based on the information received by said receiving means from said sensor apparatus placed under a prescribed environment; and transmitting means for radiating electromagnetic wave energy which is modulated by the information.

13. A read-out apparatus comprising:

transmitting means for radiating electromagnetic wave energy to the sensor apparatus as set forth in claim 2; and receiving means for collecting information from said sensor apparatus.

14. A commodity management system comprising:

the sensor apparatus as set forth in claim 2 and mounted on a commodity;

receiving means for receiving information from the sensor apparatus;

configuration means for setting a tolerance value for a parameter being detected by the sensing circuit of said sensor apparatus, based on the information received by said receiving means from said sensor apparatus placed under a prescribed environment;

transmitting means for radiating electromagnetic wave energy which is modulated by the information, said transmitting means radiating electromagnetic wave energy to the sensor apparatus; and receiving means for collecting information from said sensor apparatus.

15. A configuration apparatus comprising:

receiving means for receiving information from the sensor apparatus as set forth in claim 1;

configuration means for setting a tolerance value for a parameter being detected by the sensing circuit of said sensor apparatus, based on the information received by said receiving means from said sensor apparatus placed under a prescribed environment; and transmitting means for radiating electromagnetic wave energy which is modulated by the information.

16. A read-out apparatus comprising:

transmitting means for radiating electromagnetic wave energy to the sensor apparatus as set forth in claim 1; and receiving means for collecting information from said sensor apparatus.

17. A commodity management system comprising:

the sensor apparatus as set forth in claim 1 and mounted on a commodity;

receiving means for receiving information from the sensor apparatus;

configuration means for setting a tolerance value for a parameter being detected by the sensing circuit of said sensor apparatus, based on the information received by said receiving means from said sensor apparatus placed under a prescribed environment; said transmitting means for radiating electromagnetic wave energy which is modulated by the information;

transmitting means radiating electromagnetic wave energy to the sensor apparatus; and receiving means for collecting information from said sensor apparatus.

* * * * *